United States Patent [19]

Yamamura

[11] Patent Number: 5,354,968
[45] Date of Patent: Oct. 11, 1994

[54] BATTERY POWERED ELECTRIC CIGARETTE LIGHTER HAVING SNAP TOGETHER CONSTRUCTION AND SHUTTER-ACTUATED HEATER

[75] Inventor: Tetsuo Yamamura, Yokohama, Japan

[73] Assignee: Yumedia Co., Ltd., Japan

[21] Appl. No.: 68,616

[22] Filed: May 27, 1993

Related U.S. Application Data

[63] Continuation of Ser. No. 538,653, Jun. 15, 1990, abandoned.

[30] Foreign Application Priority Data

Jun. 17, 1989 [JP] Japan ............... 1-70927[U]

[51] Int. Cl.⁵ .................. F23Q 7/16; H05B 1/02
[52] U.S. Cl. ................... 219/268; 219/267; 219/270; 362/200
[58] Field of Search .......... 219/260, 268, 270, 263, 219/267; 361/264–266; 362/200, 201, 253

[56] References Cited

U.S. PATENT DOCUMENTS

| | | | |
|---|---|---|---|
| 2,535,665 | 12/1950 | Boyarsky et al. | 219/268 |
| 2,689,902 | 9/1954 | Burtman | 219/268 X |
| 3,098,923 | 7/1963 | Behrendt | 219/263 |
| 3,379,856 | 4/1968 | Hirsch | 219/266 X |
| 3,392,265 | 7/1968 | King et al. | 219/268 X |
| 4,816,971 | 3/1989 | Chin | 219/270 X |

FOREIGN PATENT DOCUMENTS

| | | | |
|---|---|---|---|
| 137092 | 2/1948 | Australia | 219/268 |
| 1203030 | 7/1959 | France | 219/268 |
| 61-63555 | 4/1986 | Japan . | |
| 62-261823 | 11/1987 | Japan | 219/261 |
| 254621 | 12/1948 | Switzerland | 219/268 |

*Primary Examiner*—Anthony Bartis
*Attorney, Agent, or Firm*—Ronald P. Kananen

[57] ABSTRACT

A battery powered electic cigarette lighter is formed of a half-case body and a half-case lid which can be snapped together to form a lighter casing in a manner which does not require any screws or welding. The half-case body and the half-case lid are formed with grooves which enable a spring loaded shutter to be slidably mounted in the casing. A detent in the form of a projection of the rear face of the shutter and a recess formed in the lighter casing holds the shutter in a fully closed position. The casing also contains structure which enables contacts, switch members, and a heater element to be set in position in the half-case body and to be retained in place when the half-case lid is snapped into position. The lighter casing also includes a battery compartment which is closed by a lid which is either pivotal or slidably received in grooves which are formed in the half-case body and half-case lid.

12 Claims, 3 Drawing Sheets

FIG. 1(a)
FIG. 1(b)
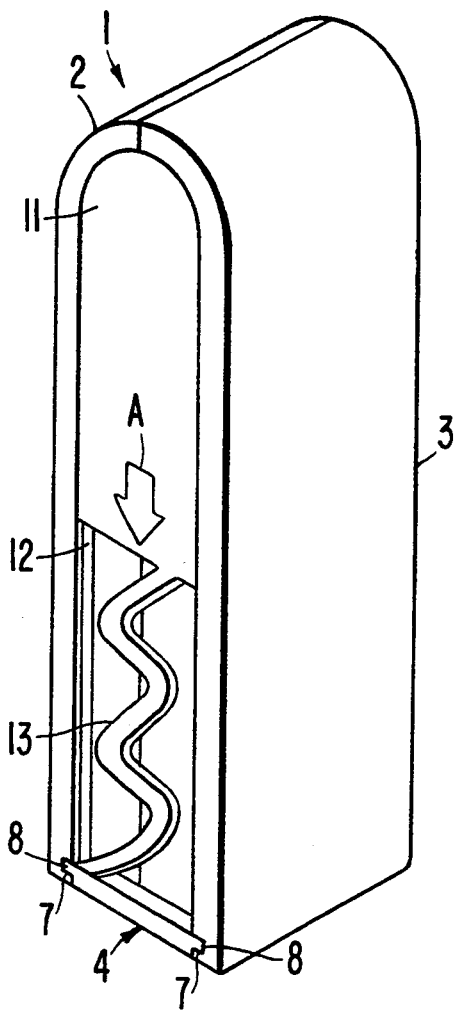
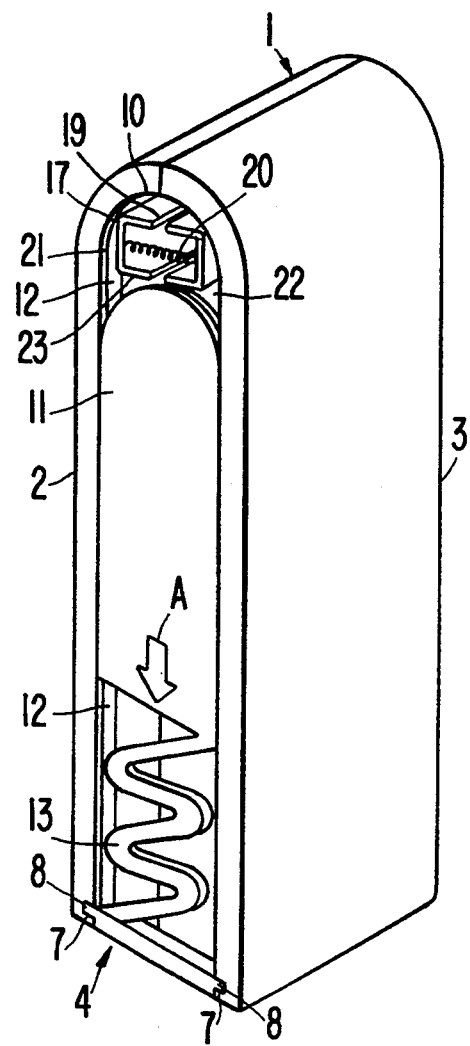
FIG. 1(c)
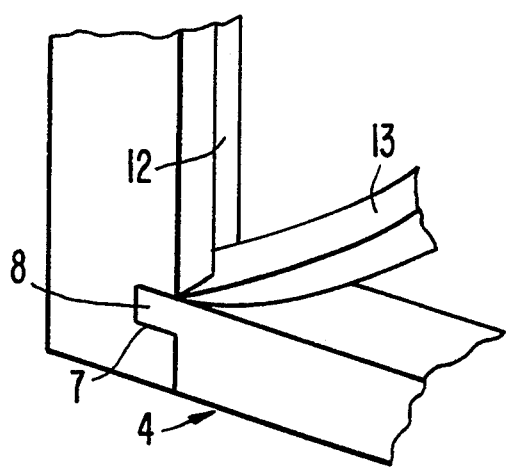

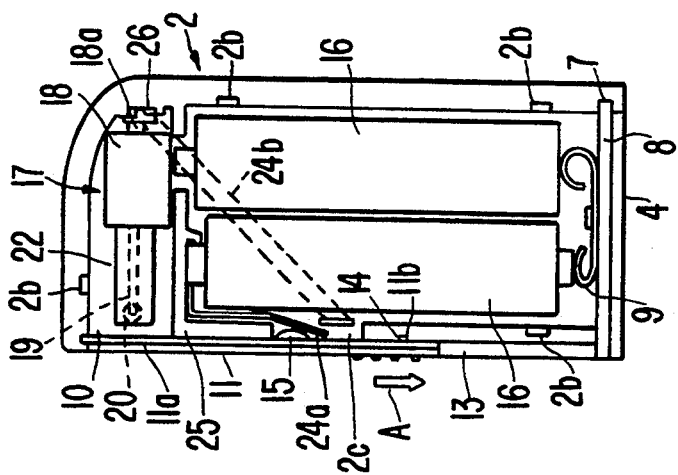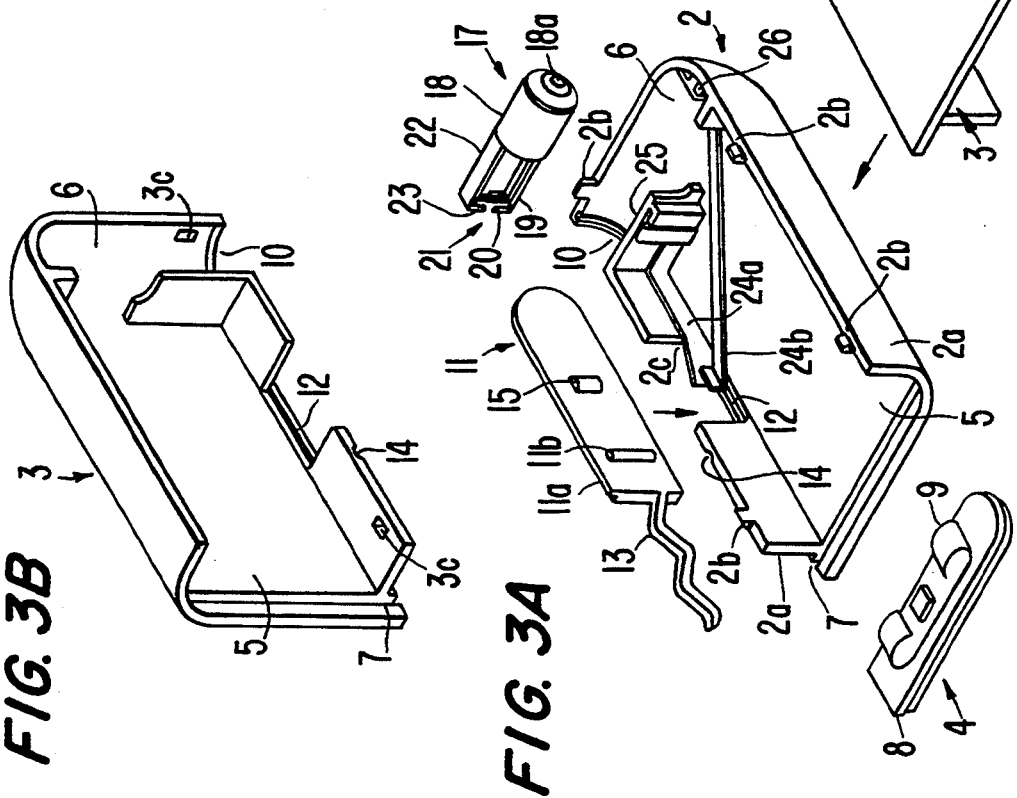

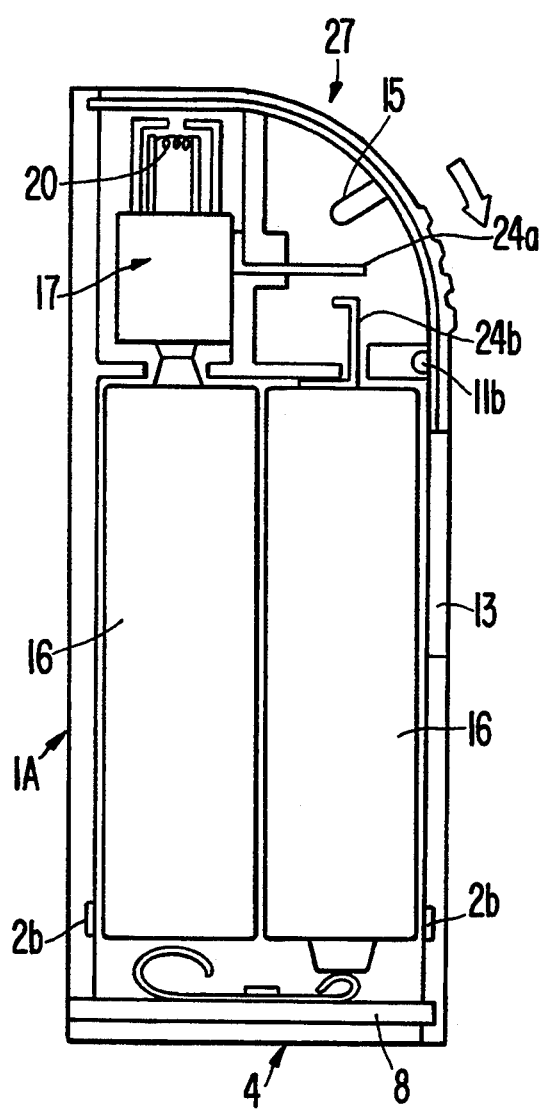
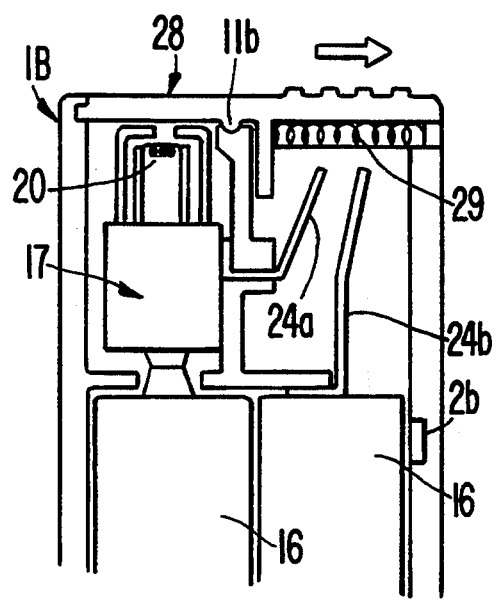
FIG. 4
FIG. 5

BATTERY POWERED ELECTRIC CIGARETTE LIGHTER HAVING SNAP TOGETHER CONSTRUCTION AND SHUTTER-ACTUATED HEATER

This is a continuation of U.S. patent application Ser. No. 07/538,653, filed Jun. 15, 1990 (now abandoned). The benefit of the earlier filing date is claimed under 35 U.S.C. § 120.

BACKGROUND OF THE INVENTION

The present invention relates to an improved cigarette lighter.

Hitherto, lighters referred to as oil or gas lighters have been known for use as cigarette lighters. These use liquefied butane gas as fuel, the fuel being lit by an ignition spark from a flint stone. Use of such gas lighters has recently become remarkably widespread.

The above-mentioned oil and gas lighters have the disadvantages in that the oil or gas lighter are difficult to light in windy outdoor conditions, and in that the generated flame is extinguished almost instantly. Also, the conventional gas lighter, filled with liquefied butane, is dangerous in that the butane is highly combustible.

Furthermore, since the liquefied gas is sealed by a nozzle or the like, there have been troubles in that if the nozzle has some defect, the gas spouts out abnormally. This can cause burning for instance of the hair, eyebrows and eyes.

For these reasons, the gas lighter is dangerous, and therefore the selling of such gas lighters is sometimes prohibited in public building. Furthermore, it is desirable not to allow the usage and carrying of such known gas lighters in crowded places.

When the flint stone or the fuel in a conventional gas lighter is used up, a refill is often hard to find, especially in another country.

Furthermore, there is the disadvantage that since the gas cyclinders are fabricated by many makers with different dimensions, the injection valve does not fit, even if a converting attachment is provided.

SUMMARY OF THE INVENTION

In order to solve the above-mentioned problems, it is an object of the present invention to provide a lighter with a simple construction, which is constituted of a smaller number of elements than the conventional gas lighter.

It is a further object to provide a lighter which is cheap in cost.

It is a further object to provide a lighter which can be reliably ignited even outdoors.

It is a further object to provide a lighter which is usable with safety.

It is a further object of the present invention to provide a lighter having a case, for containing an electric power source and a heater part including a heater heated by the electric power source, the case having an opening for accessing the heater and a shutter movably mounted at the opening, a resilient member being mounted at the end of the shutter for pushing the shutter in the direction in which the shutter is closed, wherein a switch turns ON when the shutter is opened, thereby closing an electric circuit to heat the heater, and the switch turns OFF when the shutter is closed, thereby opening the electric circuit.

In brief, the above objects are achieved a battery powered electic cigarette lighter which is formed of a half-case body and a half-case lid and which can be snapped together to form a lighter casing in a manner which does not require any screws or welding. The half-case body and the half-case lid are formed with grooves which enable a spring loaded shutter to be slidably mounted in the casing. A detent in the form of a projection of the rear face of the shutter and a recess formed in the lighter casing holds the shutter in a fully closed position. The casing also contains structure which enables contact, switch members, and a heater element to be set in position in the half-case body and to be retained in place when the half-case lid is snapped into position. The lighter casing also includes a battery compartment which is closed by a lid which is either pivotal or slidably received in grooves which are formed in the half-case body and half-case lid.

More specifically, a first aspect of the present invention resides in a lighter comprising: a half-case body; projection means formed integrally with the half-case body; means defining first and second grooves in the half-case body; a half-case lid; projection receiving means formed in the half-case lid for receiving the projection means in a manner which allows the half-case body and the half-case lid to be pressed together in a manner wherein they interlock with one another and form a casing without the need of screws or welding the casing including a heater element compartment having an access opening and a battery compartment accessible through a bottom opening; means defining third and fourth grooves in the half-case lid, the third and fourth grooves being arranged to define an essentially mirror image relationship with the first and second grooves at the bottom opening and the access opening respectively, when the half-case body and the half-case lid are assembled together to form the casing; a bottom lid which is slidably received in the first and third grooves which are located opposite one another at the bottom opening when the half-case body and the half-case lid are assembled together to form the casing, the bottom lid closing the bottom opening and retaining first and second batteries within the battery compartment of the casing; a shutter which is slidably received in the second and fourth grooves which are located opposite one another at the access opening when the half-case body and the half-case lid are assembled together to form the casing; serpentine biasing means connected with the shutter and engaging the casing for biasing the shutter to slide in a first direction along the second and fourth grooves to close the access opening; and a heater element energizable by the batteries and disposed in the heater element compartment of the casing in a location wherein, when the shutter is slid along the second and fourth grooves against the bias of the serpentine biasing means in a second direction which is opposite the first direction, the shutter assumes a position wherein the access opening of the casing is opened and the heater element is exposed through the access opening and wherein a cigarette can be brought into contact with the heater element.

A further aspect of the present invention comes in a lighter comprising: a casing comprising, a half-case body and a half-case lid; snap-in connection means included in the half-case body and half-case lid for enabling the the half-case body and the half-case lid to be interconnected by being pressed into connection with one another, the casing including a heater element compartment having an access opening and a battery compartment accessible through a bottom opening; means defining first and second grooves in an inner surface the half-case body; means defining third and fourth grooves in an inner surface of the half-case lid, the third and fourth grooves being arranged to define an essentially mirror image relationship with the first and second grooves respectively at the access opening and the bottom opening when the half-case body and the half-case lid are assembled together to form the casing; a bottom lid which is slidably received in the first and third grooves which are located opposite one another at the bottom opening when the half-case body and the half-case lid are assembled together to form the casing, the bottom lid closing the bottom opening defined in the casing and retaining first and second batteries in within the battery compartment; a shutter which is slidably received in the second and fourth grooves which are located opposite one another at the access opening when the half-case body and the half-case lid are assembled together to form the casing; a serpentine biasing means connected with the shutter and engaging the casing for biasing the shutter to slide in a first direction along the second and fourth grooves to close the access opening; a heater element disposed in the heater element compartment of the casing in a location wherein when the shutter is slid by a predetermined distance along the second and fourth grooves against the bias of the serpentine biasing means in a second direction which is opposite the first direction, the shutter assumes a position wherein the heater element is exposed through the access opening and a cigarette can be brought into contact therewith; and circuit means, responsive to the movement of the shutter, for providing a closed electrical circuit between the heater element and the first and second batteries when the slider is moved in the second direction by the predetermined distance along the second and fourth grooves.

BRIEF DESCRIPTION OF THE DRAWINGS

FIGS. 1(a) and 1(b) show different views of an embodiment of the battery-powered lighter of the present invention.

FIG. 1(c) is an enlarged view of a portion of FIG. 1(b) showing the manner in which a serpentine spring member is received in a groove formed ill a half-casing portion of the lighter case.

FIG. 2 is a front view showing the internal construction of the battery-powered lighter of FIGS. 1(a) and (b), with the half-case lid removed.

FIG. 3A is a perspective disassembled view of the parts of the lighter of FIGS. 1(a) and 1(b), without the batteries.

FIG. 3B is a perspective view showing the under side of the half-case lid which forms part of the lighter case.

FIGS. 4 and 5 show two respective modified embodiments of the present invention and respectively depict the internal constructions of the respective embodiments with the half-case lid removed.

DESCRIPTION OF PREFERRED EMBODIMENTS

The preferred embodiment of the present invention are explained with reference to the accompanying drawings, this being for the purpose of example only, and not for purposes of limiting the scope of the present invention. As seen from FIGS. 1(a), 1(b), and 1(c), a case 1 is made of synthetic resin to form a thin rectangular parallelipiped. The case 1 is composed of a half-case body 2, a half-case lid 3 in the shape of a reverse "L" (see FIG. 3), and a bottom lid 4 mounted at the bottom. The half-case lid 3 is removably fitted to the half-case body 2 by means of barbed projections 2b formed at the edge of the side wall 2a of the half-case body 2 (see FIGS. 2 and 3). The half-case lid is formed with recesses 3c which receives the projections 2b to provide a connection between the half-case body 2 and the half-case lid 3. Provided in the half-case body 2 is a space 5 for receiving two batteries as an electric power source, and a space 6 for receiving the heater part of the lighter.

The bottom lid 4 is slidably mounted in the half-case body 2 and the half-case lid 3 by providing the groove 7 at the inner periphery of the lower end portion of the half-case body 2 and the half-case lid 3, and the correspondingly fitting edge 8 in the bottom lid 4. A connecting member 9 is provided at the inner side of the bottom lid 4 for electrically connecting the terminals of the batteries.

An opening 10 is provided in the case 1 at a position corresponding to an end portion of the space 6 for receiving the heater portion, in the side wall 2a of the above-mentioned half-case body 2. A shutter 11 is mounted at the side wall 2a in which the opening 10 of the half-case body 2 is provided.

The shutter 11 is made of synthetic resin and is formed in a tongue-like shape. The shutter 11 is slidably mounted in the case 1, as a result of the edge 11a of the shutter 11 sliding in the groove 12 on the inner periphery of the opening 10 of the case 1.

A spring 13 having a wave-like or serpentine shape (viz., a serpentine biasing means) is provided as a resilient member, at the lower end of the shutter 11. The above-mentioned spring 13 is made integrally with the shutter 11, and of the same material as that of the shutter 11, the material being synthetic resin with the desired resiliency property.

When the battery lighter is not in use, the shutter 11 closes the opening 10 by the resilient force of the spring 13, as shown in FIG. 1(a).

A projection 11b is provided on the inner surface of the shutter 11, and a matching lock slot 14 is provided on the outer surface of the side wall 2a opposite to the projection 11b, for holding the projection 11b when the shutter 11 is closed. A projection 15 is also provided on the inner surface of the shutter 11, to function as a switch button as described below. The projection 15 slides along the notch 2c in the side wall 2a, in correspondence with the sliding of the shutter 11.

Dry batteries 16 are inserted into the space 5 for receiving the electric power source. In this embodiment, two No. 3-type dry batteries are connected in series by means of the connecting member 9 mounted on the bottom lid 4.

A heater part 17 is provided in the above-mentioned space 6 for receiving it. The heater part 17 is composed of a base 18, a terminal 18a mounted at the center of the rear of the base 18, two poles 19 (plus and minus) oppositely mounted at the front of the base 18, a Nichrome wire 20 extending between the two poles 19, and a guard 21 for protecting the Nichrome wire 20. The guard 21 is composed of two supports 22, mounted on the front of the base 18, and two contact portions 23 formed at the ends of the supports 22.

These contact portions 23 comprise two thin pieces each shaped in cross-section approximately like the letter U, the two together having approximately the shape of a ring, so as to enclose the Nichrome wire 20 as seen through the opening 10 in the case 1.

The Nichrome wire 20 is disposed in the same surface as the ends of the contact portions 23, or in a slightly more recessed surface, in order to protect the Nichrome wire from the pressure of the end of a cigarette being lit with the lighter.

A first end of a lead wire 24a is provided with a resilient thin plate-like form, and a first end of the lead wire 24b is also provided with a resilient thin plate-like formation. A second end of the lead wire 24a is connected to the minus terminal of the above-mentioned heater part 17, and the second end of the lead wire 24b is connected to one end of the series connected dry batteries 16.

The lead wires 24a and 24b are attached to the half-case body 2 by using a snap-in type of assembly method, without any welding or use of any screws, for inserting them into a mounting slit 26 formed in the inner wall of the space 6, and in the separating wall 25 between the space 5 for the batteries and the space 6 for the heater. Each first end of the lead wires 24a and 24b thus mounted is normally separated from each other in the notch 2c. In the case of the shutter 11 being opened (the shutter being pulled to the lower position, as indicated by the arrow A in FIG. 2), each first end of the lead wires 24a and 24b is contacted with each other by being pushed by the projection Is formed on the inner surface of the shutter 11, thereby actuating the switch, forming a closed circuit, heating the Nichrome wire 20 and igniting the cigarette. According to this embodiment of the battery lighter of the present invention, a closed circuit is formed by the projection 15 merely by opening the shutter 11 usually closes the opening 10, dust cannot penetrate into the lighter, which also avoids trouble. Also, since dry batteries which are available worldwide are used as the electric power source, replacements are easily available. Furthermore, the dry batteries 16 are easily removable, and therefore it is possible to avoid any danger when traveling, by removing them. Since the periphery of the Nichrome wire 20 is guarded by the contact portions 23, the Nichrome wire 20 in not pressed by the end of the cigarette being ignited, thereby avoiding any disconnection and damage of the Nichrome wire 20. Furthermore, since there are only a few parts and these can be put together without the need of screws or any welding, and since the lead wires 24a and 24 b are mounted by using snap-in types of connections, the fabrication of the lighters becomes easier and cheaper than for prior lighters.

The formation and construction of the case 1, the kind of the dry battery 16, the number of dry batteries, the position of the opening 10, the position and construction of the shutter 11, the shape and material of the spring 13, and the provision of the bottom lid 4 are in no way limited to that of the above embodiment.

For example, it is possible to provide the opening 10 facing upwardly, as shown in FIG. 4, to dispose the heater portion 17 upwardly, and to slidably provide a flexible shutter 27 at the arched portion of the case 1A, to slide from the upper surface of the case 1 to the side surface thereof.

As shown in FIG. 5, it is possible to slidably provide a shutter 28 for access of the cigarette to the heater from the top of the case 1B, which shutter 28 opens in the horizontal direction, and further the shutter may be actuated by a coil spring 29 instead of the resilient member 13.

The spring 13 may be made of a different material from that of the shutter 11, or as a separate part, for example as a metallic coil spring such as the coil spring 29 mentioned above, or as any other member providing a force in tension or compression. Substitutes for the Nichrome wire 20 may be used for the heater, such as a printed heater, silicon carbide (SiC) ceramics or the like. It may be possible to provide a lid body 3 which is openable for inserting a dry battery, without requiring the bottom lid 4.

As mentioned above, according to the battery lighter of the present invention, since a heater is heated by an electric power source contained within a case, without using gas for generating a flame, there is no danger of combustion and burning of the hair of the user, and further it is possible to ignite a cigarette even in wind outdoors with reliability.

Since dry batteries are available worldwide, replacements are easily available, even in foreign countries. Furthermore, by removing the dry batteries when in transit, it is unnecessary to consider the electric-powered lighter of the present invention to be a dangerous article. Since the switch is turned ON by the opening of the shutter which is slidably mounted at the front of the opening of the case, thereby forming a closed electric circuit, the heater can be heated simultaneously upon opening the shutter, thereby easily igniting a cigarette.

Since the switch is turned to the OFF state by the closing of the shutter, as a result of using the resilient member, the shutter is usually closed when the battery lighter is not used, whereby the heater is not heated and safety is maintained.

Since the opening portion is usually closed by the shutter when the lighter is not being used, any penetration of dust or the like is avoided, even when the lighter is kept in a pocket or the like, thereby producing no trouble. Since the electric power source and the heater are contained in the case, and the switch is actuated by the movement of the shutter, the number of the parts is reduced, fabrication is easy, and the cost is reduced.

The present invention is limited only by the terms of the following claims, and not to the embodiments of the drawings nor their descriptions above.

I claim:

1. A lighter comprising:
   half-case body;
   projection means formed integrally with said half-case body;
   means defining first and second grooves in said half-case body;
   a half-case lid;
   projection receiving means formed in said half-case lid for receiving said projection means in a manner which allows the half-case body and said half-case lid to be pressed together in a manner wherein they interlock with one another and form a casing without the need of screws or welding, said casing including a heater element compartment having an access opening and a battery compartment accessible through a bottom opening;
   means defining third and fourth grooves in said half-case lid, said third and fourth grooves being arranged to define an essentially mirror image relationship with said first and second grooves at said bottom opening and said access opening respectively, when said half-case body and said half-case lid are assembled together to form said casing;

a bottom lid which is slidably received in said first and third grooves which are located opposite one another at said bottom opening when said half-case body and said half-case lid are assembled together to form said casing, said bottom lid closing said bottom opening and retaining first and second batteries within said battery compartment of said casing;

a shutter which is slidably received in said second and fourth grooves which are located opposite one another at said access opening when said half-case body and said half-case lid are assembled together to form said casing;

serpentine biasing means connected with said shutter and engaging said casing for biasing said shutter to slide in a first direction along said second and fourth grooves to close said access opening; and a heater element energizable by said batteries and disposed in said heater element compartment of said casing in a location wherein, when said shutter is slid along said second and fourth grooves against the bias of said serpentine biasing means in a second direction which is opposite the first direction, said shutter assumes a position wherein the access opening of said casing is opened and said heater element is exposed through said access opening and wherein a cigarette can be brought into contact with said heater element.

2. A lighter as set forth in claim 1, further comprising circuit means for completing an electric circuit between said heater element and the first and second batteries in response to said shutter being slid along said second and fourth grooves in said second direction.

3. A lighter as set forth in claim 2, wherein the bottom lid has an electrically connecting member connected thereto, said connecting member forming part of said circuit means and comprising a single elongate strip of metal having looped portions at each end thereof which looped portions respectively contact the adjacent ends of said first and second batteries, to provide an electrical connection therebetween.

4. A lighter as set forth in claim 1, wherein said first and second grooves and said third and fourth grooves respectively intersect with one another so that the amount of shutter displacement in said second and fourth grooves can be limited by the bottom lid.

5. A lighter as set forth in claim 1, wherein said serpentine biasing means is formed integrally with said shutter and engages said bottom lid as a reaction member.

6. A lighter as set forth in claim 5, wherein said serpentine biasing means has a free end which is received in one of said second and fourth grooves.

7. A lighter as set forth in claim 1, wherein said shutter member is flexible and wherein said second and fourth grooves have curved portions which guide the portion of said shutter which is received therein along a curved path.

8. A lighter as set forth in claim 7, wherein said shutter has an inwardly extending projection which follows an arcuate path and engages a flexible electrical contact which forms part of said circuit means in a manner which causes the flexible contact to flex and engage a stationary contact which forms part of said circuit means when the shutter is slid along said second and fourth grooves in said second direction.

9. A lighter as set forth in claim 1, wherein said half-case body and said half-case lid have first and second wall portions respectively which are formed immediately adjacent said first and third grooves and which extend toward and contact one another when said half-case body and said half-case lid are assembled to form said casing.

10. A lighter as set forth in claim 1, wherein said first and second wall portions are respectively formed with first and second locking slot portions which are aligned with one and other when said half-case body and said half-case lid are assembled to form said casing, said first and second locking slot portions cooperating to receive a projection formed on a surface of said shutter when said shutter assumes a position wherein said heater element is concealed.

11. A lighter comprising:

a casing comprising, a half-case body and a half-case lid;

snap-in connection means included in said half-case body and half-case lid for enabling the said half-case body and said half-case lid to be interconnected by being pressed into connection with one another, said casing including a heater element compartment having an access opening and a battery compartment accessible through a bottom opening;

means defining first and second grooves in an inner surface said half-case body;

means defining third and fourth grooves in an inner surface of said half-case lid, said third and fourth grooves being arranged to define an essentially mirror image relationship with said first and second grooves respectively at said access opening and said bottom opening when said half-case body and said half-case lid are assembled together to form said casing;

a bottom lid which is slidably received in said first and third grooves which are located opposite one another at said bottom opening when said half-case body and said half-case lid are assembled together to form said casing, said bottom lid closing said bottom opening defined in said casing and retaining first and second batteries in within said battery compartment;

a shutter which is slidably received in said second and fourth grooves which are located opposite one another at said access opening when said half-case body and said half-case lid are assembled together to form said casing;

a serpentine biasing means connected with said shutter and engaging said casing for biasing said shutter to slide in a first direction along said second and fourth grooves to close said access opening;

a heater element disposed in the heater element compartment of said casing in a location wherein when said shutter is slid by a predetermined distance along said second and fourth grooves against the bias of said serpentine biasing means in a second direction which is opposite the first direction, said shutter assumes a position wherein said heater element is exposed through said access opening and a cigarette can be brought into contact therewith; and circuit means, responsive to the movement of said shutter, for providing a closed electrical circuit between said heater element and the first and second batteries when said slider is moved in the second direction by the predetermined distance along said second and fourth grooves.

12. A lighter as set forth in claim 11, wherein said snap-in connection means includes barbed projections formed on said half-case body.

* * * * *